United States Patent
Arai et al.

(10) Patent No.: US 8,820,655 B2
(45) Date of Patent: Sep. 2, 2014

(54) TEMPERATURE SENSITIVE ACTUATOR ATTACHING STRUCTURE

(75) Inventors: Tetsuya Arai, Wako (JP); Kazuyoshi Iizuka, Kawaguchi (JP)

(73) Assignees: Nippon Thermostat Co., Ltd., Tokyo (JP); Honda Motor Co., Ltd., Tokyo (JP)

( * ) Notice: Subject to any disclaimer, the term of this patent is extended or adjusted under 35 U.S.C. 154(b) by 524 days.

(21) Appl. No.: 13/320,752

(22) PCT Filed: Feb. 15, 2010

(86) PCT No.: PCT/JP2010/052142
§ 371 (c)(1),
(2), (4) Date: Nov. 15, 2011

(87) PCT Pub. No.: WO2010/137361
PCT Pub. Date: Dec. 2, 2010

(65) Prior Publication Data
US 2012/0060362 A1 Mar. 15, 2012

(30) Foreign Application Priority Data

May 28, 2009 (JP) ................................. 2009-129240

(51) Int. Cl.
*G05D 23/02* (2006.01)
*F03G 7/06* (2006.01)
*F02M 1/12* (2006.01)

(52) U.S. Cl.
CPC ... *F03G 7/06* (2013.01); *F02M 1/12* (2013.01)
USPC ........................ 236/99 R; 236/99 K; 236/100

(58) Field of Classification Search
CPC ..... G05D 23/02; G05D 23/021; G05D 23/19; G05D 23/2401; G05D 23/275; G05D 23/27524

USPC ..... 236/86, 87, 99 R, 99 K, 100; 60/527, 530
See application file for complete search history.

(56) References Cited

U.S. PATENT DOCUMENTS

| 4,313,561 A * | 2/1982 | Kenny .................. 237/12.3 A |
| 4,392,608 A * | 7/1983 | Blades ..................... 236/48 R |
| 2012/0062354 A1 | 3/2012 | Izuka et al. |

FOREIGN PATENT DOCUMENTS

| JP | S60-056877 U | 4/1985 |
| JP | H04-042253 U | 4/1992 |
| JP | H07-238868 A | 9/1995 |
| JP | H10-238650 A | 9/1998 |
| JP | 2006-063864 A | 3/2006 |
| JP | 2006-274898 A | 10/2006 |
| JP | 2010-276107 A | 12/2010 |

* cited by examiner

*Primary Examiner* — Marc Norman
(74) *Attorney, Agent, or Firm* — Orion Consulting, Ltd.; Joseph P. Farrar, Esq.

(57) ABSTRACT

Provided is a temperature sensitive actuator attaching structure wherein the ease of attachment is improved. A heat generating element (51) generates heat by energizing a temperature sensitive actuator (2) via conducting terminals (41, 42). The generated heat expands a wax (W) to project a piston (21), and an elastic member (23) biases the piston (21) in a direction opposite to the projecting direction. In order to attach the temperature sensitive actuator (2) to an attachment portion (11) of an object member (1), fixing protrusions (41*a*) are provided in the conducting terminal (41) of the temperature sensitive actuator (2), and receiving portions (14) which can receive the fixing protrusions (41*a*) in a direction perpendicular to the axis of the piston (21) are provided in the attachment portion (11). The temperature sensitive actuator (2) is attached to the object member (1) by inserting the fixing protrusions (41*a*) into the receiving portions (14).

2 Claims, 8 Drawing Sheets

TEMPERATURE SENSITIVE ACTUATOR ATTACHING STRUCTURE

BACKGROUND OF THE INVENTION

1. Technical Field

The present invention relates to an attaching structure for attaching to a mounting member a temperature sensitive actuator that, by heating up a thermo-element, expands wax and projects a piston.

2. Description of the Background Art

Conventionally, there is known, attached to a mounting member composed of an automatic choke device, a temperature sensitive actuator comprised of a thermo-element that generates heat when energized by an electric current through terminals, wax that expands with the heating up of the thermo-element, a piston that projects through an aperture formed in the casing of the actuator as the wax expands, and an elastic member that biases the piston in a direction opposite to the direction in which it projects (for example, JP-2006-63864-A).

In the device described in JP-2006-63864-A, a cylinder is formed on the mounting member and the temperature sensitive actuator is inserted into the cylinder. However, with such a configuration, the axis along which the piston of the temperature sensitive actuator moves during operation and the axis of the cylinder are the same, with the result that the temperature sensitive actuator easily falls out of the cylinder. For this reason, typically the temperature sensitive actuator is attached to the mounting member with screws, to prevent the temperature sensitive actuator from falling out of the cylinder.

However, such an arrangement requires means for screwing the temperature sensitive actuator to the mounting member, necessitating time and trouble and increasing manufacturing costs.

SUMMARY OF THE INVENTION

The present invention has as its object to provide an attaching structure that improves the ease with which the temperature sensitive actuator is assembled.

To achieve this object, the present invention provides an attaching structure for attaching to a mounting member a temperature sensitive actuator having a thermo-element that generates heats when energized through electrical terminals, wax that expands when heated by the heat from the thermo-element, a piston that projects as the wax expands, and a elastic member that biases the piston toward a non-projecting side, the attaching structure comprising fixing protrusions provided to the temperature sensitive actuator electrical terminals and openings provided to the mounting member that accommodate the fixing protrusions from a direction orthogonal to a longitudinal axis of the piston, wherein the temperature sensitive actuator is fixedly mounted in place by the fixing protrusions being accommodated within the openings.

According to the present invention, fixing protrusions are provided to the electrical terminals, and these fixing protrusions are inserted into openings in the mounting member from a direction orthogonal to the long axis of the piston to fix the temperature sensitive actuator in place on the mounting member. As a result, it is possible to attach the temperature-sensitive actuator without screws, and compared to the conventional actuator it is possible to improve the ease with which the temperature sensitive actuator is assembled.

Moreover, according to the present invention, a concave portion open to the direction in which the elastic member biases the piston is formed in the openings, and the fixing protrusions are biased by the elastic member against the concave portions to fix the temperature sensitive actuator in place.

With such a structure, it is possible to fix the temperature sensitive actuator securely in place and it is possible to improve further the ease with which the temperature sensitive actuator is assembled using the biasing force of the elastic member that returns the piston of the temperature sensitive actuator to the non-projecting state as the temperature decreases.

DETAILED DESCRIPTION OF THE INVENTION

Figure 1:
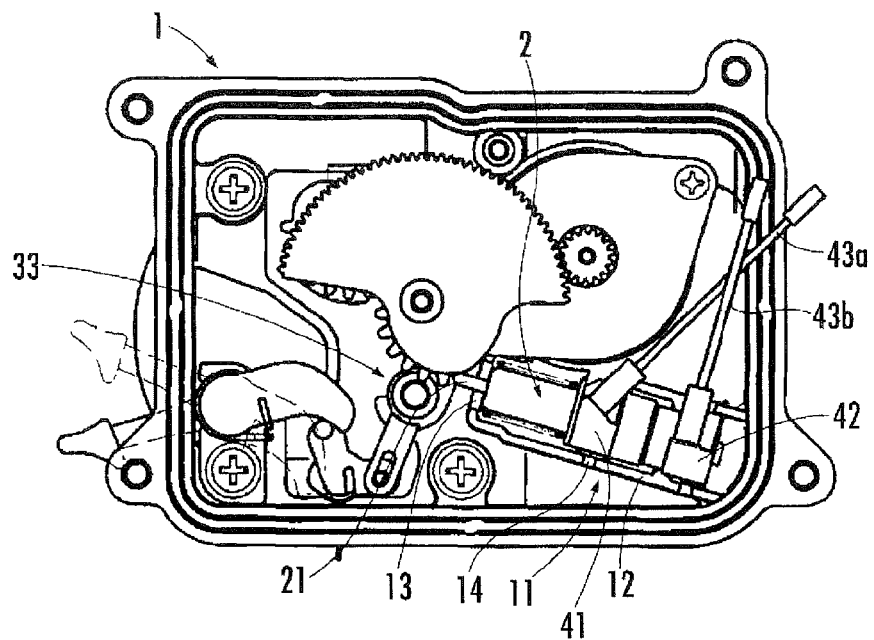
FIG. 1A is a plan view of a temperature sensitive actuator attaching structure according to a first embodiment of the present invention and FIG. 1B shows a front view of the first embodiment.
Figure 1:
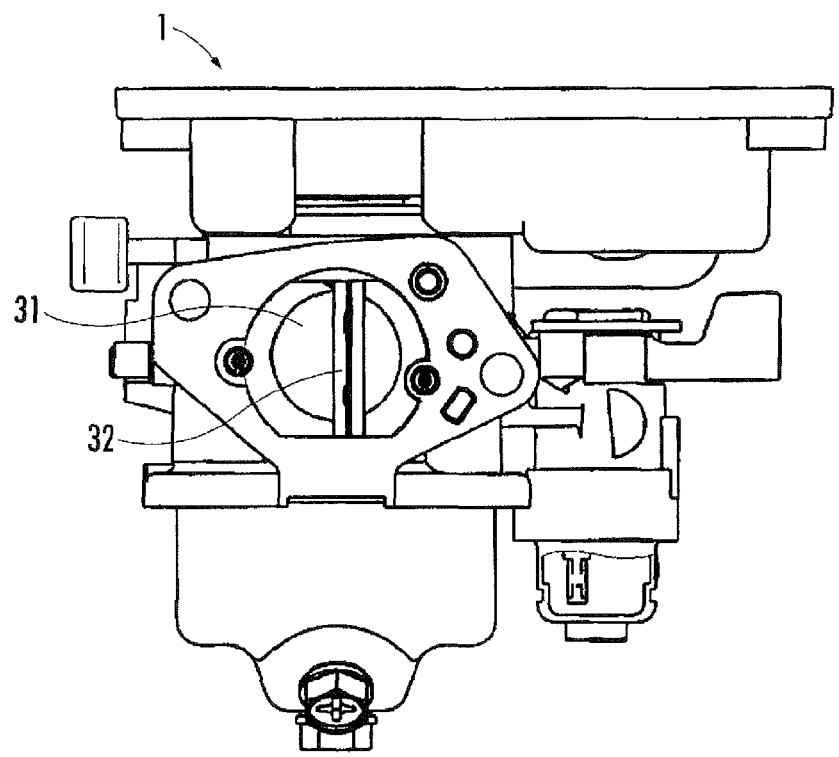

With reference to FIGS. 1-4, a description is given of a temperature sensitive actuator attaching structure according to a first embodiment of the present invention, using an automatic choke device as the thing to which the actuator is to be attached. An automatic choke device 1 shown in FIG. 1 is mounted on a carburetor installed in an ordinary engine, not shown, and is provided with a temperature sensitive actuator 2 enclosing an outwardly projectable piston 21, and a butterfly-type choke valve 32 that closes an air intake path 31. When the piston 21 of the temperature sensitive actuator 2 projects outward, it closes the choke valve 32 through a link mechanism 33.

Figure 2:
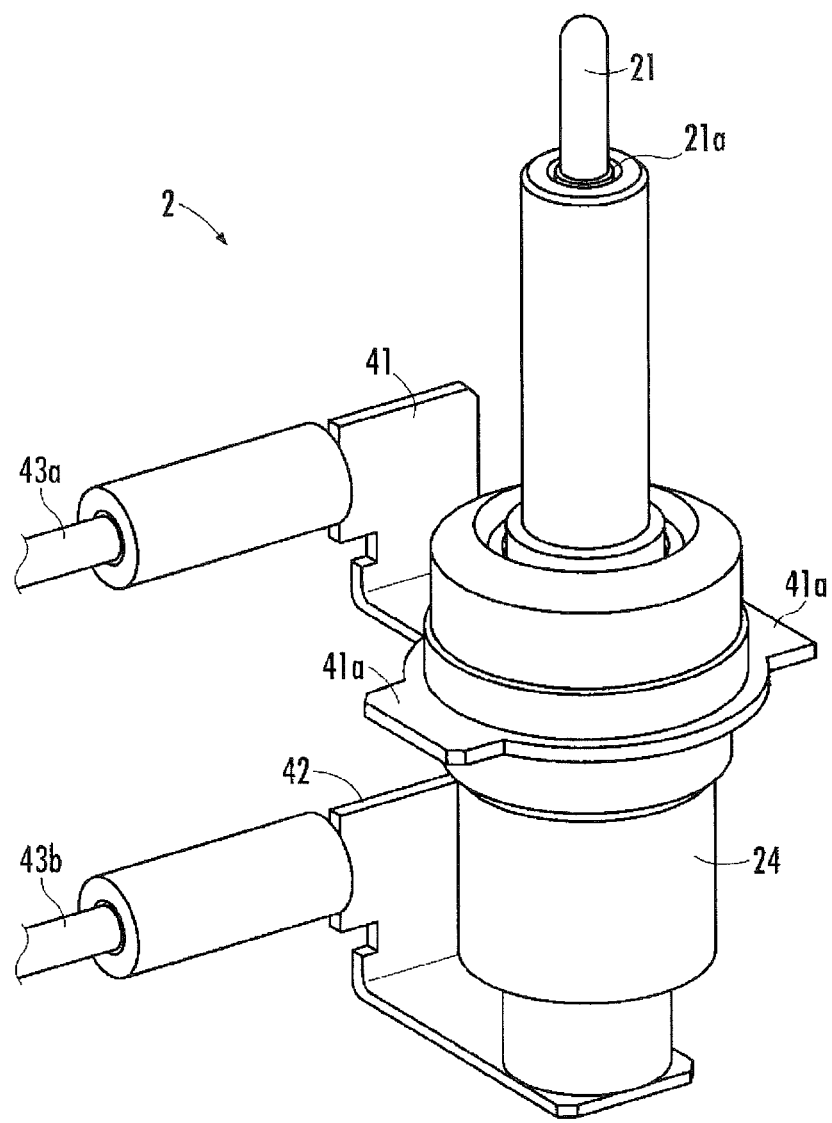
FIG. 2 is a perspective view of a temperature sensitive actuator according to the first embodiment.
Figure 3:
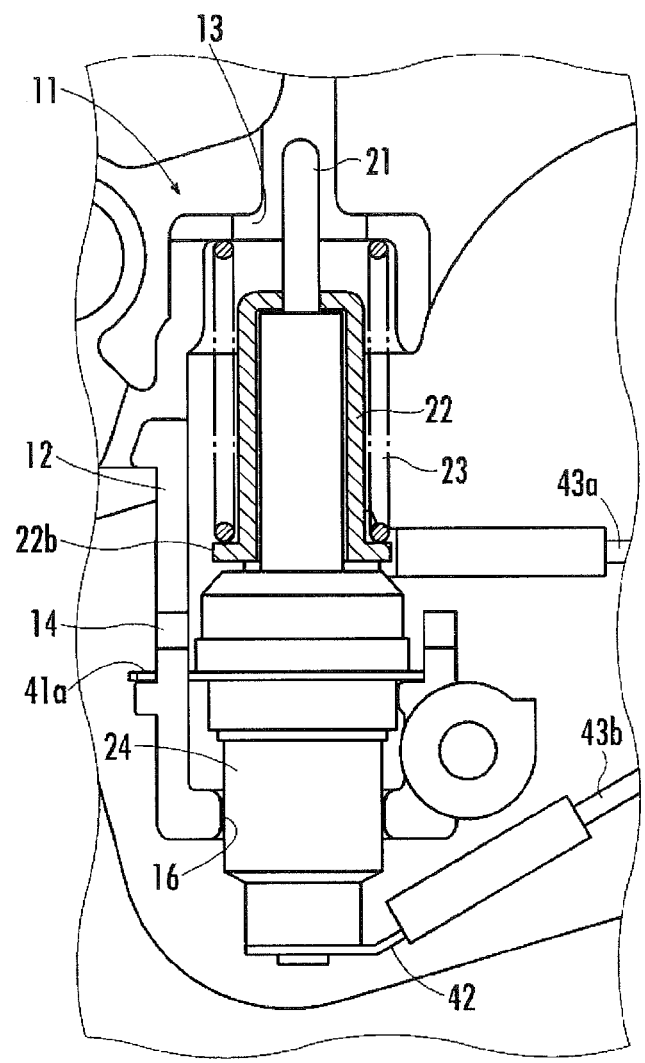
FIG. 3 is an enlarged view of an attaching portion of a mounting member of FIG. 1A.
Figure 4:
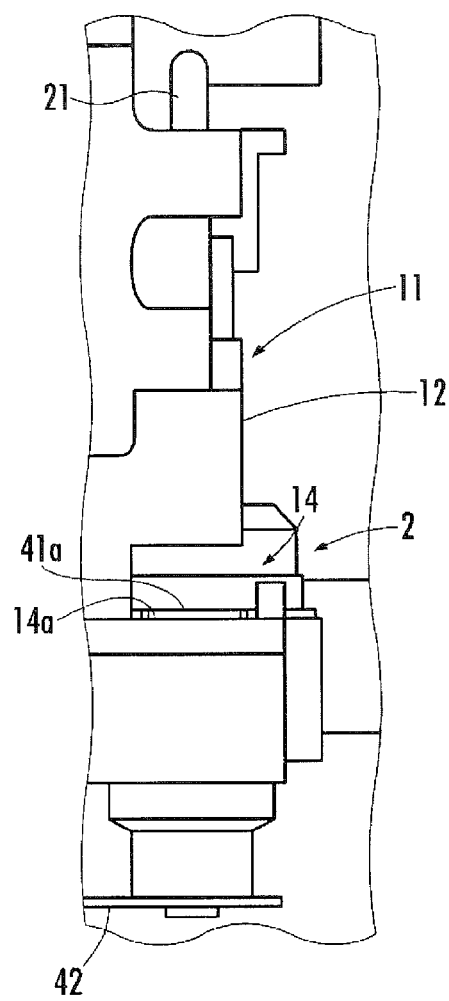
FIG. 4 is a side view of the attaching portion shown in FIG. 3.

As shown in FIG. 2, the temperature sensitive actuator 2 is provided with two electrical terminals, a first terminal 41 and a second terminal 42, spaced apart at an interval along the longitudinal axis of the piston 2. To each of the terminals 41, 42 are connected lead wires 43a, 43b. The temperature sensitive actuator 2 is energized through the two terminals 41, 42, a thermo-element composed of a PTC heater disposed within a casing 24 heats up, and the wax expands, projecting the piston 21.

A pair of fixing protrusions 41a is formed on the forward end electrical terminal 41. An attaching portion 11 for attaching the temperature sensitive actuator 2 is provided to the automatic choke device 1. The attaching portion 11 is configured as a substantially rectangular convex wall portion 12, and inside this convex wall portion 12 is attached the temperature sensitive actuator 2.

A cutout 13 that accommodates the piston 21 is provided in the forward end of the convex wall portion 12. In addition, openings 14 that accommodate the pair of fixing protrusions 41a are formed in the sides of the convex wall portion 12. Each of the openings 14 is provided with a rearward facing concave portion 14a. A cutout 16 that abuts the temperature sensitive actuator 2 casing 24 to position the temperature sensitive actuator 2 is provided in the rear end of the convex wall portion 12.

The tip of the piston 21 is formed with a reduced diameter, by which a stepped portion 21a is formed. In addition, attached to the piston 21 is a bearing member 22 that is engaged by the stepped portion 21a near the tip of the piston 21 and bears an elastic member 23 composed of a return spring via a flange 22b provided to the rear end of the piston 21.

The elastic member 23 composed of a return spring is disposed between the flange 22b and an inner face of the forward end of the convex wall portion 12. The elastic member 23 biases the piston rearward to a non-projecting state through the bearing 22 that is engaged by the stepped portion of the piston 21.

The fixing protrusions 41a of the temperature sensitive actuator 2 are biased by the elastic member 23 and abut the read end face of the concave portions 14a. By so doing, the temperature sensitive actuator 2 is prevented from moving axially with respect to the automatic choke device 1.

Moreover, by positioning the pair of fixing protrusions 41a of the temperature sensitive actuator 2 within the concave portions 14a, the temperature sensitive actuator 2 is prevented from rotating within the convex wall portion 12 as well as from falling out of the convex wall portion 12.

With the temperature sensitive actuator 2 attaching structure of the first embodiment, the temperature sensitive actuator 2 is strongly fixedly mounted within the convex wall portion 12 by the elastic member 23, the fixing protrusions 41a, 41a, and the concave portions 14a, 14a. As a result, the temperature sensitive actuator 2 is reliably prevented from falling out of the convex wall portion 12 due to vibration or the like, and further, compared to the conventional screw-stopped actuator, the ease with which it is possible to assemble the temperature sensitive actuator 2 is improved.

Moreover, since there is no need for the space used for screwing the actuator in place as in the conventional case, there is greater range of choices available for the location of the temperature sensitive actuator 2 and at the same time it is possible to make the automatic choke device 1 more compact. In addition, because the casing 24 of the temperature sensitive actuator 2 abuts the cutout 16 in the rear end of the convex wall portion 12, the temperature sensitive actuator 2 is positioned in place. This positioning, together with the fixing protrusions 41a, 41a and the concave portions 14a, 14a, can prevent the temperature sensitive actuator 2 from tilting within the convex wall portion 12.

It is to be noted that although in the first embodiment a description is given of a case in which the thing to which the temperature sensitive actuator 2 is to be attached is the automatic choke device 1, the thing to which the temperature sensitive actuator 2 is to be attached is not limited thereto.

Second Embodiment

Next, with reference to FIGS. 5-9, a description is given of a temperature sensitive actuator attaching structure according to a second embodiment of the present invention. As with the first embodiment, the temperature sensitive actuator 2 of the second embodiment is one that is attached to an automatic choke device 1. Elements that are the same as those of the first embodiment are given the same reference numerals and a description thereof is omitted.

It is to be noted that the temperature sensitive actuator 2 of the second embodiment, like the temperature sensitive actuator 2 of the first embodiment, is energized through two electrical terminals 41, 42, a thermo-element 51 composed of a PTC heater disposed within a casing 24 (see FIG. 8 and FIG. 9) heats up, and wax W (see FIG. 8 and FIG. 9) expands, projecting the piston 21 outward.

Figure 5:
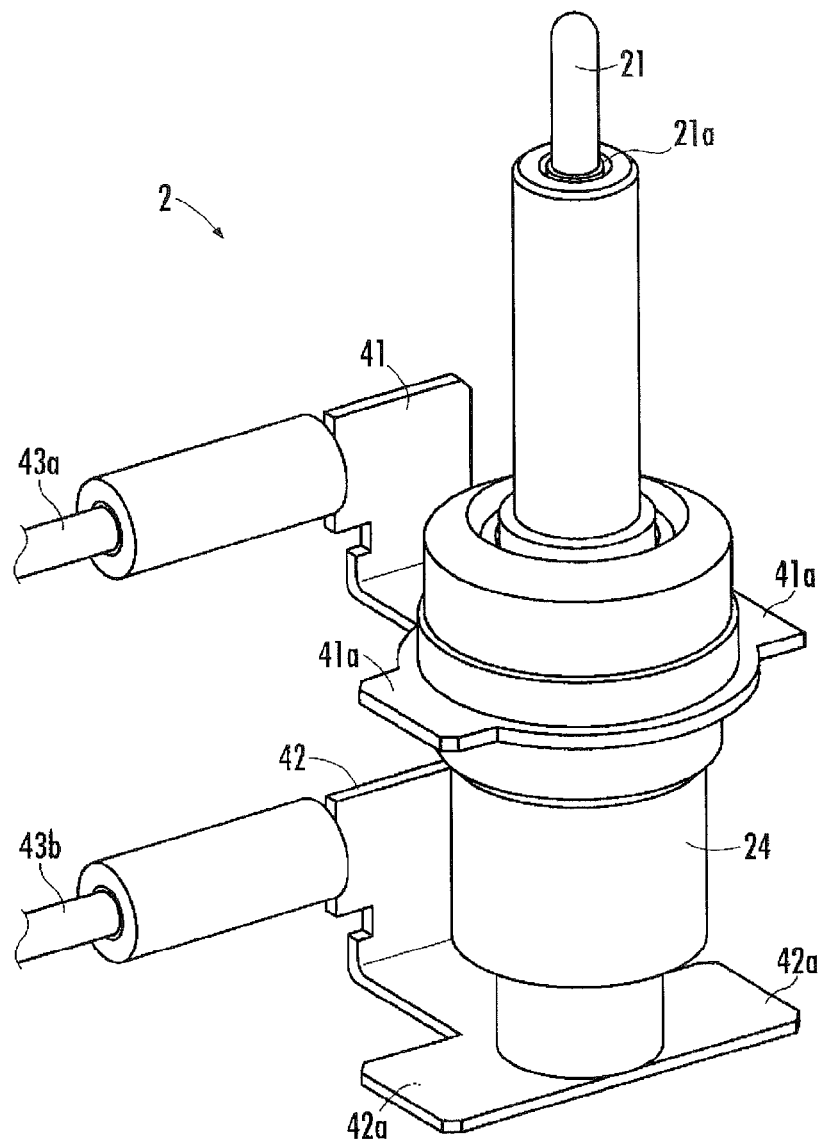
FIG. 5 is a perspective view of a temperature sensitive actuator according to a second embodiment.
Figure 6:
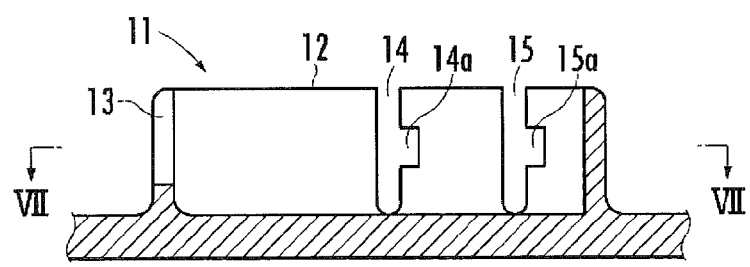
FIG. 6 is a cross-sectional view of an attaching portion of a mounting member of the second embodiment.

As shown in FIG. 5, in the temperature sensitive actuator 2 of the second embodiment a pair of fixing protrusions 42a, 42a is also provided on the rear end electrical terminal 42. In addition, as shown in FIGS. 6-9, instead of the cutout 16 of the first embodiment a pair of openings 15, 15 that accommodate the fixing protrusions 42a, 42a are formed in the side wall of the convex wall portion 12 of the second embodiment. The openings 15, 15 are each provided with a rearward facing concave portion 15a, 15a.

The tip of the piston 21 is formed with a reduced diameter, thus forming a stepped portion 21a. In addition, attached to the piston 21 is a bearing member 22 that is engaged by the stepped portion 21a near the tip of the piston 21 and bears an elastic member 23 composed of a return spring via a flange 22b provided to the rear end of the piston 21.

The elastic member 23 composed of a return spring is disposed between the flange 22b and an inner face of the forward end of the convex wall portion 12. The elastic member 23 biases the piston rearward to a non-projecting state through the bearing 22, which is engaged by the stepped portion of the piston 21.

The fixing protrusions 41a of the temperature sensitive actuator 2 are biased by the elastic member 23 and abutted against the rear end face of the concave portions 14a. By so doing, the temperature sensitive actuator 2 is prevented from moving axially with respect to the automatic choke device 1.

The fixing protrusions 41a, 42a are positioned inside the openings 14a, 15a, so that the temperature sensitive actuator 2 is prevented from rotating within the convex wall portion 12 as well as from falling out of the convex portion 12.

With the attaching structure of the temperature sensitive actuator 2 according to the second embodiment, the temperature sensitive actuator 2 is strongly fixedly mounted within the convex wall portion 12 by the elastic member 23, the fixing protrusions 41a, 42a, and the concave portions 14a, 15a. As a result, the temperature sensitive actuator 2 is reliably prevented from falling out of the convex wall portion 12 due to vibration or the like, and further, compared to the conventional screw-stopped actuator, the ease with which it is possible to assemble the temperature sensitive actuator 2 is improved. Moreover, since there is no need for the space used for screwing the actuator in place as in the conventional case, there is greater range of choices available for the location of the temperature sensitive actuator 2 and at the same time it is possible to make the automatic choke device 1 more compact.

In addition, the fixing protrusions 41a are abutted against the rear end faces of the concave portions 14a by the elastic member 23, and the fixing projections 42a are spaced an interval apart from the rear end face of the concave portions 15a. As a result, matters are arranged so that it is possible to accomplish accurate positioning with the rear end faces of the concave portions 14a alone, and not only is it possible to design the depth of the concave portions 15a so as to create a gap with respect to the fixing protrusions 42a but it is also possible to form the concave portions 15a with ease.

It is to be noted that it is also possible to achieve the same effect with concave portions 14a, 15a formed so that the fixing protrusions 42a abut the rear end faces of the concave portions 15a while the fixing protrusions 41a are space an interval apart from the rear end faces of the concave portions 14a.

Moreover, although in the second embodiment a description is given of a case in which the thing to which the temperature sensitive actuator 2 is to be attached is the automatic choke device 1, the thing to which the temperature sensitive actuator 2 is to be attached is not limited thereto.

Third Embodiment

Figure 7:
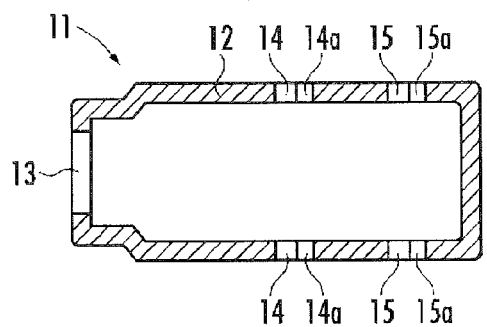
FIG. 7 is a cross-sectional view along a line VII-VII in FIG. 6.
Figure 8:
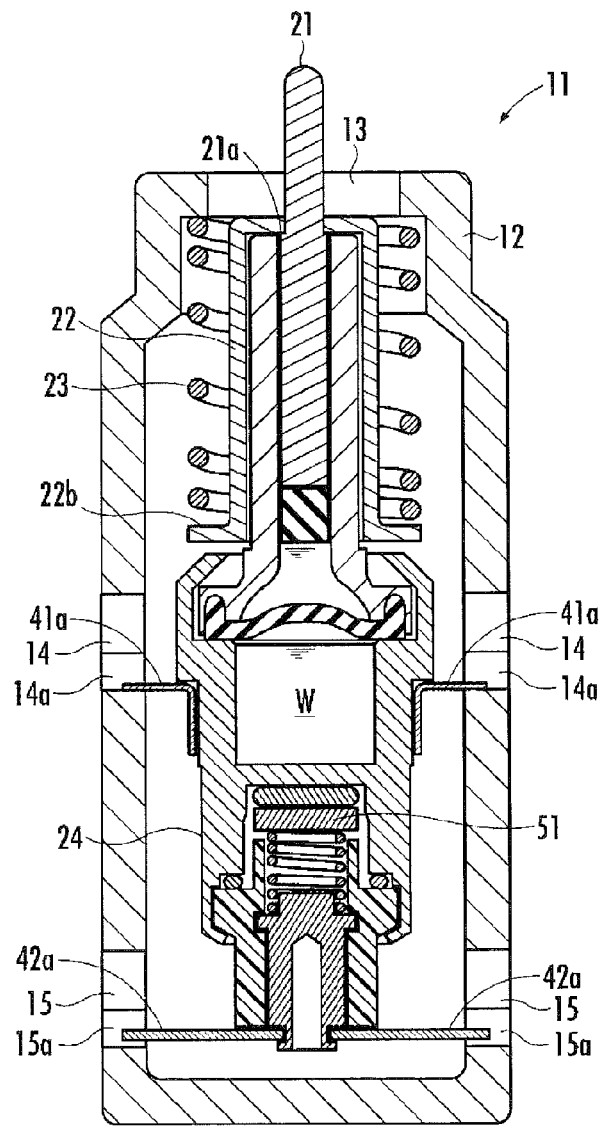
FIG. 8 is a cross-sectional view showing a piston of the temperature sensitive actuator of the second embodiment in a non-projecting state.
Figure 9:
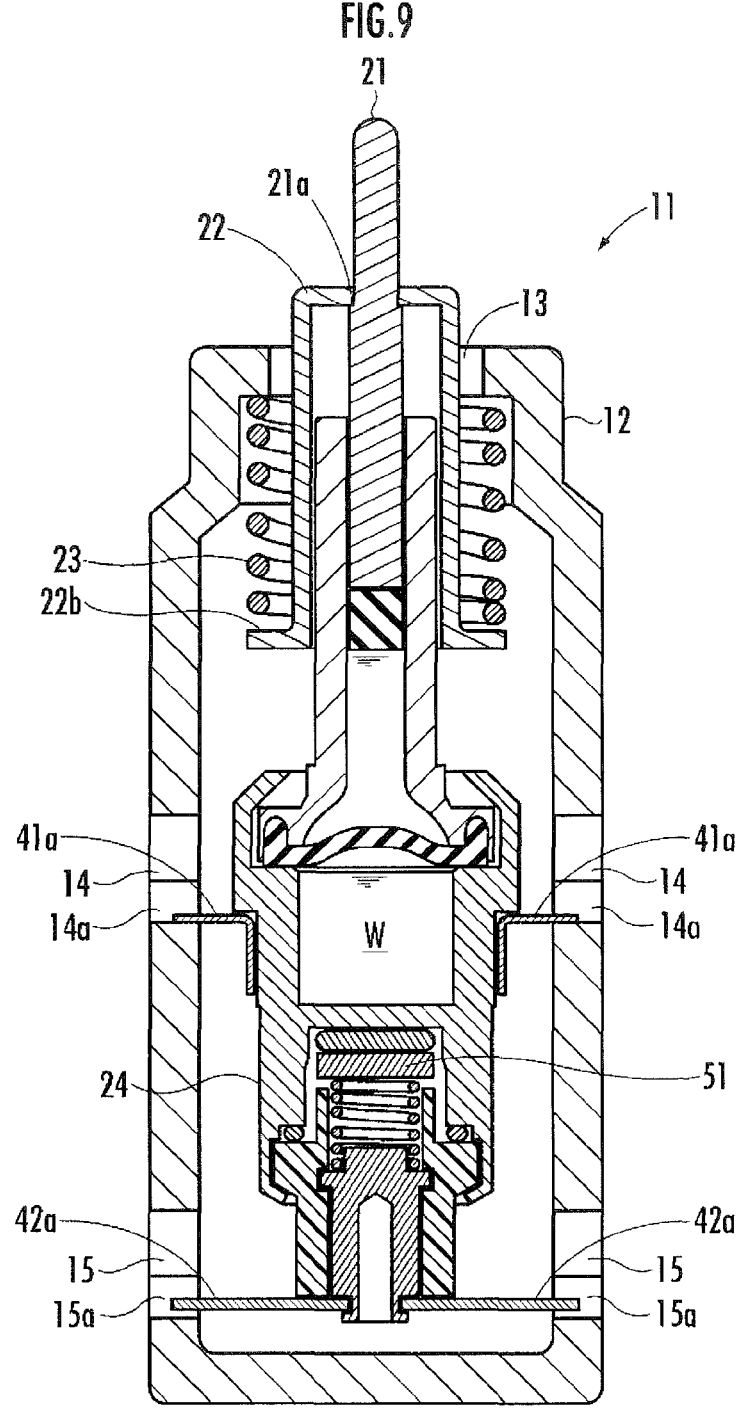
FIG. 9 is a cross-sectional view showing a piston of the temperature sensitive actuator of the second embodiment in a projecting state.
Figure 10:
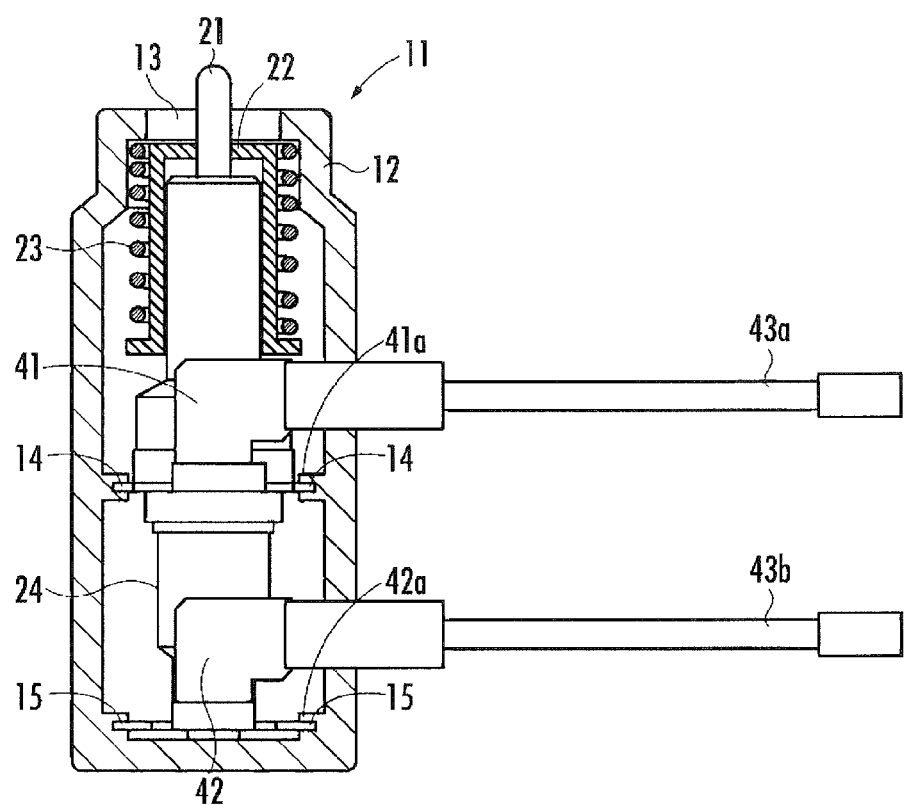
FIG. 10 illustrates a temperature sensitive actuator attaching structure according to a third embodiment of the present invention.

As a third embodiment, as shown in FIG. 7, the openings 14, 15 may be formed as slits and the fixing protrusions 41a, 42a simply pressed into the openings 14, 15 to fix the temperature sensitive actuator 2 in place. The concave portions 14a, 15a of the second embodiment are not provided to the openings 14, 15 of the third embodiment.

What is claimed is:

1. An attaching structure for attaching to a mounting member a temperature sensitive actuator having a thermo-element that generates heats when energized through electrical terminals, wax that expands when heated by the heat from the thermo-element, a piston that projects as the wax expands, and a elastic member that biases the piston toward a non-projecting side, the attaching structure comprising:
fixing protrusions provided to the temperature sensitive actuator electrical terminals; and
openings provided to the mounting member that accommodate the fixing protrusions from a direction orthogonal to a longitudinal axis of the piston,
wherein the temperature sensitive actuator is fixedly mounted in place by the fixing protrusions being accommodated within the openings.

2. The temperature sensitive actuator attaching structure according to claim 1, wherein:
a concave portion open to the direction in which the elastic member biases the piston is formed in each of the openings; and
the fixing protrusions are biased by the elastic member against the concave portions to fix the temperature sensitive actuator in place.

* * * * *